United States Patent [19]

Herko et al.

[11] Patent Number: 5,306,370
[45] Date of Patent: Apr. 26, 1994

[54] METHOD OF REDUCING CHIPPING AND CONTAMINATION OF RESERVOIRS AND CHANNELS IN THERMAL INK PRINTHEADS DURING DICING BY VACUUM IMPREGNATION WITH PROTECTIVE FILLER MATERIAL

[75] Inventors: Lawrence H. Herko, Walworth; Robert P. Altavela, Pittsford; Joseph R. Weber; Robert M. White, both of Rochester; Kathryn A. Wallace, Canandaigua, all of N.Y.

[73] Assignee: Xerox Corporation, Stamford, Conn.

[21] Appl. No.: 970,499

[22] Filed: Nov. 2, 1992

[51] Int. Cl.⁵ .................................. B32B 31/00
[52] U.S. Cl. ............................ 156/155; 156/250; 156/280; 427/238; 427/295; 427/156; 427/293; 427/374.2; 437/227
[58] Field of Search ............... 156/250, 257, 259, 263, 156/268, 285, 381, 286, 382, 155, 278; 437/226, 227; 118/50; 427/238, 294, 374.2, 154, 293, 156, 352, 295

[56] References Cited

U.S. PATENT DOCUMENTS

| Re. 32,572 | 1/1988 | Hawkins et al. | 156/626 |
|---|---|---|---|
| 2,711,969 | 6/1955 | Abig | 117/4 |
| 3,775,215 | 11/1973 | Fasching | 156/278 |
| 3,816,158 | 6/1974 | Jacobs | 427/374.2 |
| 3,948,701 | 4/1976 | Fasbender | 156/155 |
| 3,970,494 | 7/1976 | Pritchard | 156/155 |
| 4,133,920 | 1/1979 | Schulthess | 427/294 |
| 4,339,295 | 7/1982 | Boretos | 156/155 |
| 4,469,649 | 9/1984 | Ibaz | 264/23 |
| 4,473,424 | 9/1984 | Sorko-Ram | 156/268 |
| 4,479,986 | 10/1984 | Juday | 118/50 |
| 4,606,962 | 8/1986 | Reylek | 156/250 |
| 4,638,337 | 1/1987 | Torpey et al. | 346/140 R |
| 4,678,529 | 7/1987 | Drake et al. | 156/234 |
| 4,715,917 | 12/1987 | Tirelli | 156/250 |
| 4,720,317 | 1/1988 | Kuroda | 156/250 |
| 4,755,396 | 7/1988 | Geisler | 427/375 |
| 4,774,530 | 9/1988 | Hawkins | 346/140 R |
| 4,878,992 | 11/1989 | Campanelli | 156/633 |
| 4,897,141 | 1/1990 | Girard | 156/250 |
| 4,956,037 | 9/1990 | Vivaldi | 156/257 |
| 5,133,995 | 7/1992 | Do | 118/50 |
| 5,152,857 | 10/1992 | Ito | 156/153 |

FOREIGN PATENT DOCUMENTS

| 0075846 | 5/1983 | Japan | 437/226 |
|---|---|---|---|
| 1335201 | 10/1973 | United Kingdom | 437/226 |

Primary Examiner—David A. Simmons
Assistant Examiner—Mark De Simone
Attorney, Agent, or Firm—Robert A. Chittum

[57] ABSTRACT

A method of fabricating thermal ink jet printheads comprises aligning and bonding a pair of silicon wafers together, which have, on opposing confronting surface thereof, a plurality of sets of linear arrays of heating elements and associated driver circuitry on one wafer surface and a plurality of sets of parallel grooves and a communicating reservoir for each set of grooves. The grooves and reservoirs are filled with a filler material which is solid or gels at room temperature and liquid at higher temperatures. The bonded pair of wafers are severed into a plurality of individual printhead sby dicing processes conducted at room temperature. One of the dicing processes cuts the grooves in a direction perpendicular thereto in order to form concurrently the nozzle face and nozzles. The solid filler material supports fragile edges of the wafers and prevents entry of dicing debris and other contaminants. The printheads are subjected to heat, spinning, and high pressure water spray to remove the filler material.

7 Claims, 5 Drawing Sheets

METHOD OF REDUCING CHIPPING AND CONTAMINATION OF RESERVOIRS AND CHANNELS IN THERMAL INK PRINTHEADS DURING DICING BY VACUUM IMPREGNATION WITH PROTECTIVE FILLER MATERIAL

BACKGROUND OF THE INVENTION

This invention relates to thermal ink jet printing, and more particularly, to an improved method of fabricating a thermal ink jet printhead by use of a filler material in the internal cavities of bonded ink jet silicon wafers which is solid or gels at room temperature during the dicing operation which separates the bonded wafers into a plurality of individual printheads.

Thermal ink jet printing is a type of drop-on-demand ink jet systems, wherein an ink jet printhead expels ink droplets on demand by the selective application of a current pulse to a thermal energy generator, usually a resistor, located in capillary-filled, parallel ink channels a predetermined distance upstream from the channel nozzles or orifices. The channel end opposite the nozzles are in communication with a small ink reservoir to which a larger external ink supply is connected.

U.S. Pat. No. Re. 32,572 to Hawkins et al discloses a thermal ink jet printhead and several fabricating processes therefor. Each printhead is composed of two parts aligned and bonded together. One part is a substantially flat substrate which contains on the surface thereof a linear array of heating elements and addressing electrodes, and the second part is a substrate having at least one recess anisotropically etched therein to serve as an ink supply manifold when the two parts are bonded together. A linear array of parallel grooves are also formed in the second part, so that one end of the grooves communicate with the manifold recess and the other ends are open for use as ink droplet expelling nozzles. Many printheads can be made simultaneously by producing a plurality of sets of heating element arrays with their addressing electrodes on a silicon wafer and by placing alignment marks thereon at predetermined locations. A corresponding plurality of sets of channel grooves and associated manifolds are produced in a second silicon wafer. In one embodiment, alignment openings are etched in the second silicon wafer at predetermined locations. The two wafers are aligned via the alignment openings and alignment marks, then bonded together and diced into many separate printheads.

U.S. Pat. No. 4,638,337 to Torpey et al discloses an improved thermal ink jet printhead similar to that of Hawkins et al, but has each of its heating elements located in a recess. The recess walls containing the heating elements prevent the lateral movement of the bubbles through the nozzle and therefore the sudden release of vaporized ink to the atmosphere, known as blow-out, which causes ingestion of air and interrupts the printhead operation whenever this event occurs. In this patent a thick film organic structure such as Riston ® or Vacrel ® is interposed between the heater plate and the channel plate. The purpose of this layer is to have recesses formed therein directly above the heating elements to contain the bubble which is formed over the heating elements, thus enabling an increase in the droplet velocity without the occurrence of vapor blow-out and concomitant air ingestion.

U.S. Pat. No. 4,878,992 to Campanelli discloses an ink jet printhead fabrication process wherein a plurality of printheads are produced from two mated substrates by two dicing operations. One dicing operation produces the nozzle face for each of a plurality of printheads and optionally produces the nozzles. This dicing blade, together with specific operating parameters, prevent the nozzles from chipping and the nozzle faces from scratches and abrasions. A second dicing operation with a standard dicing blade severs the mated substrates into separate printheads. The dicing operation which produces the nozzle face is preferably conducted in a two-step operation. A first cut makes the nozzle face, but does not sever the two mated substrates. A second dicing cut severs the two substrates, but does so in a manner that prevents contact by the dicing blade with the nozzle face.

In all ink jet printing systems, the nozzle or orifice size, shape, and surface conditions affect the characteristics and trajectory of the ink droplet emitted from the nozzle. Some ink jet printers have a separate nozzle plate which is independently fabricated to obtain the desired dimensional tolerances and surface conditions. This nozzle plate is then aligned and bonded to the droplet generator or printhead. In addition to the dimensional precision, attachment is sometimes difficult and debonding is a constant concern. Also, if an adhesive is used, it may flow into the nozzle or ink paths, thereby restricting or impairing the droplet ejection and/or trajectory. Other ink jet printers have printheads fabricated from two substrates, as disclosed in the prior art discussed above, in which one substrate contains the heating elements and the other contains ink recesses, which, when the substrates are aligned and bonded together, serve as ink passageways. The open ends of the passageways terminate about 1.0 to 5.0 mils in front of the heating elements and create the nozzles. The front face of the printhead containing the nozzles have a major impact on the droplet characteristics and trajectories. One discontinuity at the nozzle is made by chipping of the unsupported edges of the channels during the dicing operation which concurrently forms the nozzle face and nozzles by cutting across one end of the channels in a direction perpendicular thereto. A second problem with severing bonded silicon wafer pairs in a plurality of individual printheads, is that dicing debris is readily forced through the nozzles and wedged into the channels. The dicing debris is usually difficult, if not impossible, to remove because of the relatively small cross-sectional areas of the channels and nozzles.

This invention overcomes the above-mentioned two problems associated with the standard dicing techniques used to separate bonded, thermal-ink-jet, silicon-wafer pairs into a plurality of printheads.

SUMMARY OF THE INVENTION

It is an object of the present invention to provide an improved fabricating method for an ink jet printhead.

It is another object of this invention to provide a printhead fabricating method for sectioning two or more mated substrates, one substrate containing a plurality of sets of heating elements and drive circuitry and the other substrate containing a corresponding plurality of sets of ink channels with each set having an associated reservoir and ink inlet. The sectioning operation produces a plurality of individual printheads and concurrently produces the printhead nozzle face and nozzles therein without chipping the nozzles or forcing dicing debris into the channels.

In the present invention, a plurality of thermal ink jet printheads are obtained from a structure consisting of an electrically insulative or semiconductive substrate having a plurality of sets of passivated heating elements and driver circuitry formed thereon, which is aligned and bonded to a silicon substrate having a corresponding plurality of sets of etched ink channels and associated reservoir with ink inlet, and a thick film polymer layer such as, for example, polyimide, sandwiched therebetween with etched pits which are aligned to expose each of the heating elements, as disclosed in the above-identified patent to Torpey et al. The individual printheads are produced by a sectioning operation, generally accomplished through dicing by a dicing blade. The final layer making up the sectionable structure is an adhesive layer comprising a two-part thermal setting epoxy approximately 0.5 to 1.0 micron thick which bonds the silicon substrate with the recesses to the thick film polymer layer covering the insulative or semi-conductive layer having the passivated heating elements and electrodes. This adhesive layer and its method of application is described more fully in U.S. Pat. No. 4,678,529 to Drake et al.

After the two substrates are aligned and bonded together, the channels and reservoirs are vacuum filled with a filler material which is solid or gelled at room temperature and liquid at higher temperatures. The bonded substrates are placed in a vacuum chamber to remove air in the cavities comprising the channels and reservoirs and then placed in a container of heated, liquid filler material, such as low viscosity polyglycol, wax copolymers, wax, or gelatin, while under a vacuum. After the bonded substrates are removed from the liquid filler material, they are cooled to solidify the filler material and removed from the vacuum chamber.

For forming a nozzle face, a two-step dicing operation is the preferred sectioning procedure, though a single dicing step is sufficient. When using the two-step procedure, a circular resinoid dicing blade having a predetermined thickness, diameter, and surface speed ranges is used to produce the nozzle face with the appropriate surface finish. This dicing step cuts through the silicon substrate, adhesive layer, the thick film polymer layer, and the insulative or semi-conductive surface. In one embodiment, the electrically insulative or semiconductive substrate is first notched by a dicing blade prior to the dicing operation which concurrently forms the nozzle face and nozzles. This notch is parallel to and in alignment with the subsequent nozzle face forming dicing cut, so that the nozzle forming dicing cut intersects and severs the bonded substrates into a plurality of printheads. In another embodiment, the bonded structure remains together by the relatively thin silicon material at the bottom of relatively deep grooves defining the rows of individual printheads. A second dicing step uses a second blade which is directed along the grooves formed by the first dicing blade to separate the bonded substrate into individual rows of printheads, followed by a second dicing cut to sever the rows into individual printheads. Finally, the individual printheads are heated to remove the filler material, which supported fragile edges of the nozzles during the dicing processes and substantially eliminates chipping. The plugged channels and reservoirs also prevented dicing debris and other contaminates from being forced therein.

A more complete understanding of the present invention can be obtained by considering the following detailed description in conjunction with the accompanying drawings, wherein like parts have like index numerals.

DESCRIPTION OF THE PREFERRED EMBODIMENT

According to U.S. Pat. No. 4,638,337 to Torpey et al and U.S. Pat. No. Re. 32,572 to Hawkins et al, thermal ink jet printheads may be mass produced by sectioning of at least two mated planar substrates containing on confronting surfaces thereof respective matched sets of linear arrays of heating elements with driver circuitry and linear arrays of parallel elongated grooves, each set of grooves being in communication with a common recess having an opening through the opposite substrate surface. The elongated grooves serve as ink channels, and the common recess serves as an ink reservoir. The recess opening is the ink inlet to which an ink supply is connected. Each ink channel contains a heating element and the sectioning operation, generally a dicing operation, opens the ends of the ink channels opposite the ends communicating with the reservoir, if not already open, and forms the nozzle containing surface. After the sectioning operation, the heating elements are located at a predetermined location upstream from the nozzles. The main difference between the above identified patents is that Torpey et al contains an intermediate thick film polymer layer sandwiched between the mated substrates. The thick film layer is etched to expose the heating elements, this effectively places the heating elements in a pit whose vertical walls inhibit vapor bubble growth in the direction parallel to the heating element surface. This prevents vapor blow-out and the resultant ingestion of air which produces a rapid printhead failure mode. U.S. Pat. No. 4,774,530 discloses forming a trench straddling the ends of the grooves and reservoir recess to provide an ink flow by-pass as the means for providing communication therebetween.

This invention relates to an improved dicing method for sectioning of the multiple printhead containing substrates into separate printheads as disclosed in the U.S. patents to Torpey et al and Hawkins et al and, accordingly, U.S. Pat. No. 4,638,337, 4,774,530 and U.S. Pat. No. Re. 32,572 are hereby incorporated by reference. These and other prior art delineate dicing as a means of sectioning mated substrates wafers, and U.S. Pat. No. 4,878,992 to Campanelli, also incorporated herein by reference, discloses the dicing blade and dicing parameters which will provide the nozzle face and nozzles therein. Unfortunately, the dicing technique disclosed in Campanelli has two major problems which the present invention corrects. One problem is that the unsupported edges of the grooves, which serve as nozzles in the nozzle face, are subject to chipping. The other problem is that dicing debris is readily forced into the grooves, which serve as ink channels, and is collected in the reservoir through the reservoir inlet.

Figure 1:
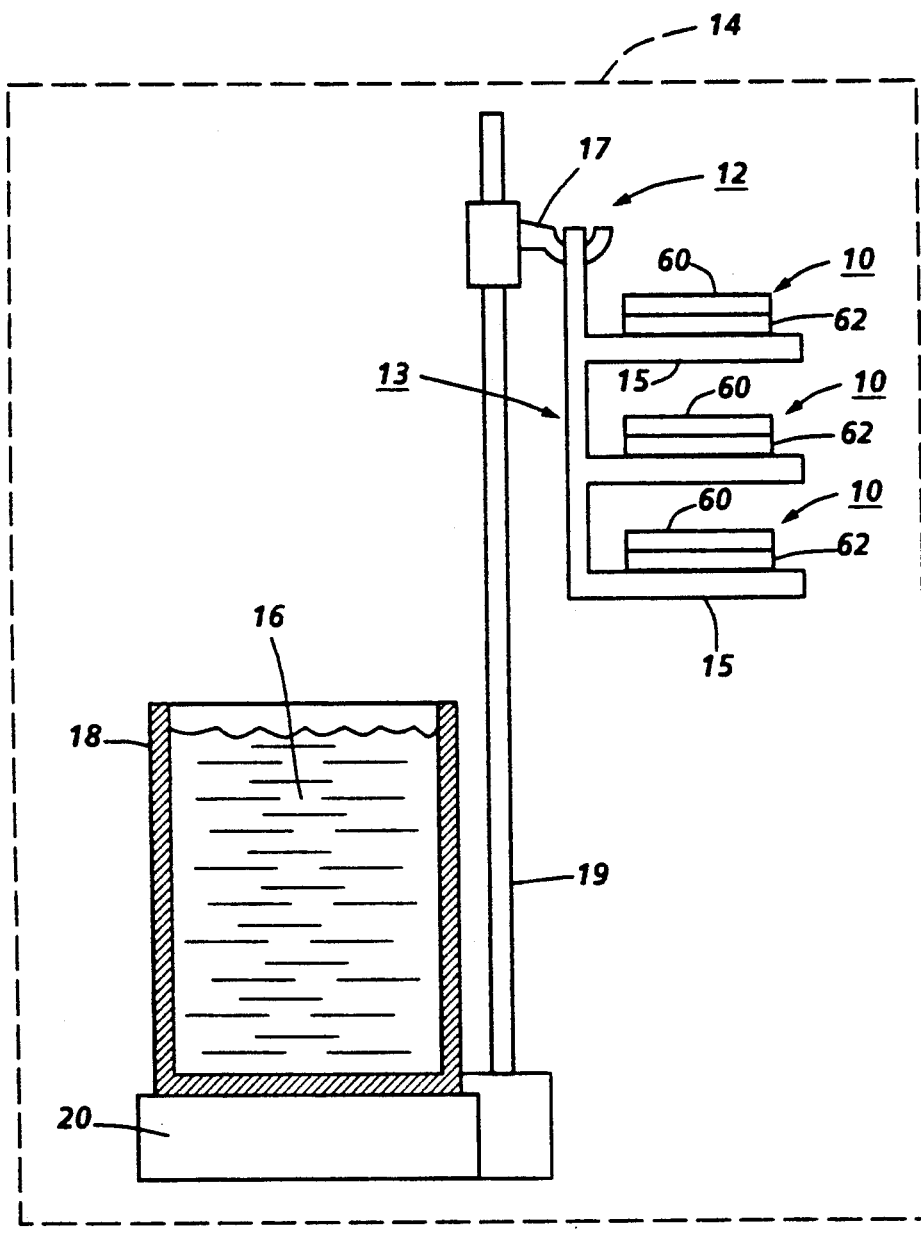
FIG. 1 is a schematic elevation view of a vacuum chamber shown in dashed line with a container of liquid filler material and remotely controlled bonded substrate holding device therein.

According to the present invention, these problems are eliminated by filling the grooves 21 and reservoirs 22 with a filler material 16 (see FIG. 4 or FIG. 6) which is solid at room temperature or gels at room temperature, so that the fragile edges of the nozzles 27 (FIG. 5) are supported during the dicing processes at room temperature. Of equal importance, the grooves and reservoirs are filled, so that dicing debris cannot enter and neither can other types of contaminants. Referring to FIG. 1, one or more bonded substrate pairs 10, as produced in accordance with the above patents incorporated by reference, are placed on a remotely controlled holding device 12, such as a standard robotic apparatus, inside of vacuum chamber 14, shown in dashed line. Also, inside the vacuum chamber is a container 18 of filler material 16, such as, for example, water soluble polyglycol, which is solid at room temperature. Other filler materials could be used such as wax or paraffins, but this type of filler material generally requires the use of a solvent to clean the printheads after they had been separated by the dicing process. To remove the difficulties of removing and cleaning wax from printhead channels and reservoirs, ethoxylated polyethylene alcohol waxes which are solid at room temperature are used, such as Unithox ® by the Petrolite Corporation, and mixed with polyoxyethylene (POE) in the ratio of 5% to 50% wax by weight. This mixture is not only solid at room temperature, but exhibits substantially reduced solubility in cold or ambient temperature water (i.e., about 15° C. to 25° C.). This feature prevents the problem of the removal of filler material when water based lubricants are used during the dicing operation. If filler material is removed by the lubricant, dicing debris generated could still be forced into channels and reservoirs and the edges of the nozzles would not be adequately supported. When the mixture of the alcohol wax and POE is to be removed, the printheads are placed into hot water, i.e. about 60° C. or above where the POE causes a microdispersion of alcohol wax (Unithox ®) in the hot water.

In another embodiment, the filler material is a gelatin which gels at room temperature of 25° C. or lower. As a vacuum filled filler material, gelatin possesses a number of advantageous properties; viz., (1) it is not removed by water based dicing saw lubricant at room temperature (i.e., about 25° C.), (2) has optical clarity to allow normal registration without requiring local removal and may be colored for better visual inspection, (3) is hydrophillic so that there is substantially no chemical contamination of the internal surface areas of the printheads, and (4) is readily removed by using a presurized, hot deionized water while spinning the printheads. However, should the bonded wafers filled with gelatin require storage prior to dicing, the gelatin filled wafer pairs must by stored in water at room temperature to prevent mold and the like from being generated by the exposed gelatin.

The container 18 resides on a heating device 20 for subsequently heating the filler material and changing its state from solid to liquid. The vacuum chamber is sealed by well known means such as a tightly sealable door (not shown) and a vacuum is pulled by an interconnected vacuum pump (not shown) to at least 10 inches of water and held at that vacuum for about one hour. This vacuum removes all air from the cavities in the bonded substrate pairs 10 produced by the grooves and reservoir recesses formed in one of the substrates, silicon wafer 60. The other substrate 62 may also be a silicon wafer and contains on one surface thereof the heating elements and driver circuitry (not shown). The fact that the grooves are closed at one end compounds the problem of entrapping air therein when filling with the liquefied filler material. Thus, pulling a vacuum on the bonded substrate pair 10 is essential if all air is to be removed and replaced with filler material. While the bonded substrates or silicon wafers 60, 62 (bonded substrate pair 10) are being held under a vacuum, the heating device 20, which may be a simple electrically heated plate (not shown), is energized to heat the container and the filler material therein.

Figure 2:
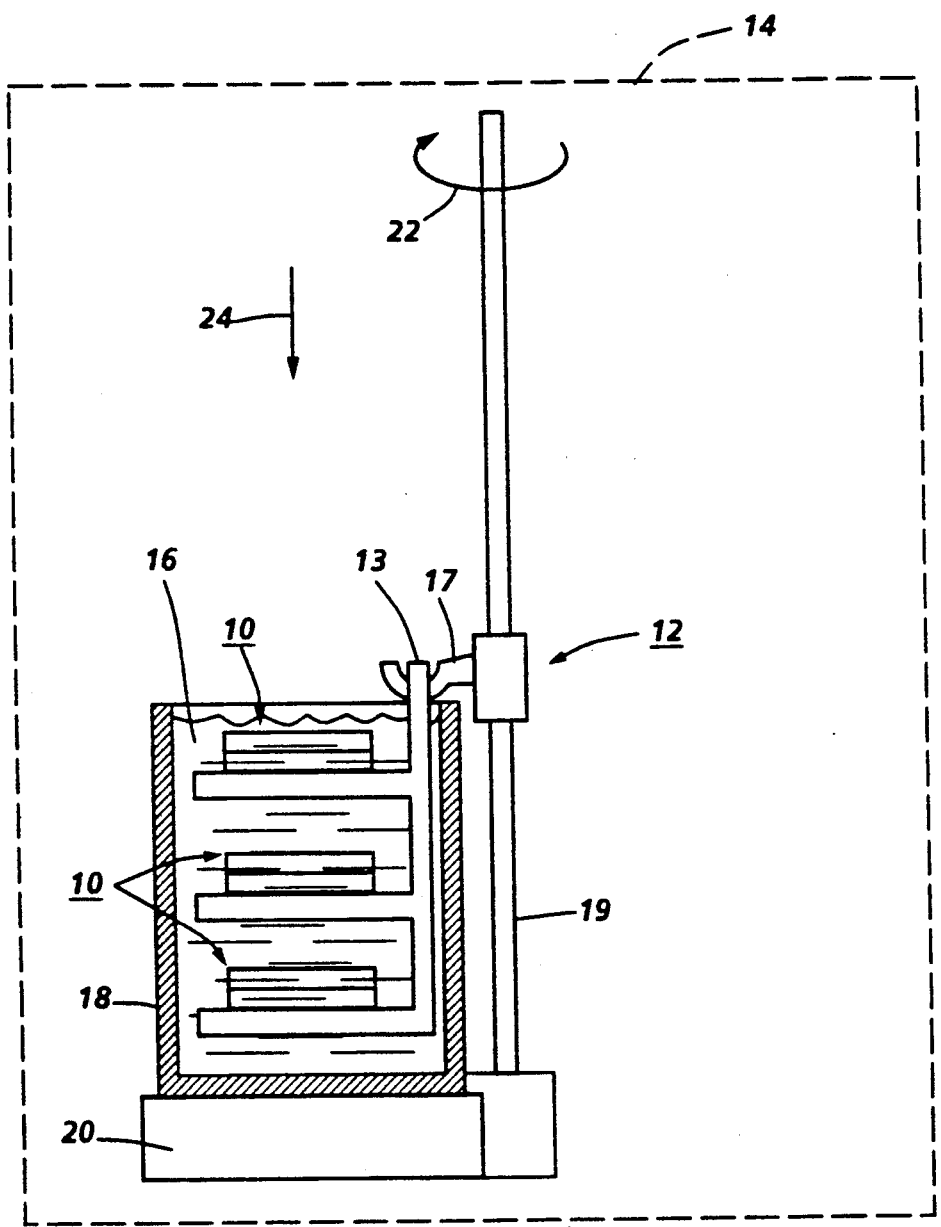
FIG. 2 is a similar view as that shown in FIG. 1, with the bonded substrate holding device placing the bonded substrates into the container of liquid filler material.

When the air has been removed from the grooves and reservoirs of the bonded substrate pair 10, the holding device rotates in the direction of arrow 22 and lowers the bonded substrate pair 10 into the liquid filler material 16 depicted by arrow 24 as shown in FIG. 2. The bonded substrate pair is removed from the liquid filler material after about five minutes, the heating device is de-energized and the bonded substrate pair allowed to cool until room temperature is reached to solidify the filler material. This procedure is accomplished under a vacuum to prevent entry of air into the grooves and reservoirs through entrainment of air in the filler material. After the filler material has reached the solid state, the vacuum is relieved from the vacuum chamber and the bonded substrate pair with the solid filler material retrieved therefrom.

As indicated above, any standard robotic mechanism which could be controlled outside of the vacuum chamber may be used to hold the bonded wafers, while they are under vacuum, place them into a heated, liquefied filler material, and remove them from the filler material for cooling. In the embodiment shown in FIGS. 1 and 2, a multilayered tray 13 holds several bonded substrates. Though three tray shelves 15 are shown, an actual tray would hold many more. The tray is held by a arm 17 mounted on a vertical post 19. The arm 17 is capable of being raised and lowered on the post by, for example, motor driven rack and pinion (not shown) and the post is capable of being rotated about the post axis by any known means.

Figure 3:
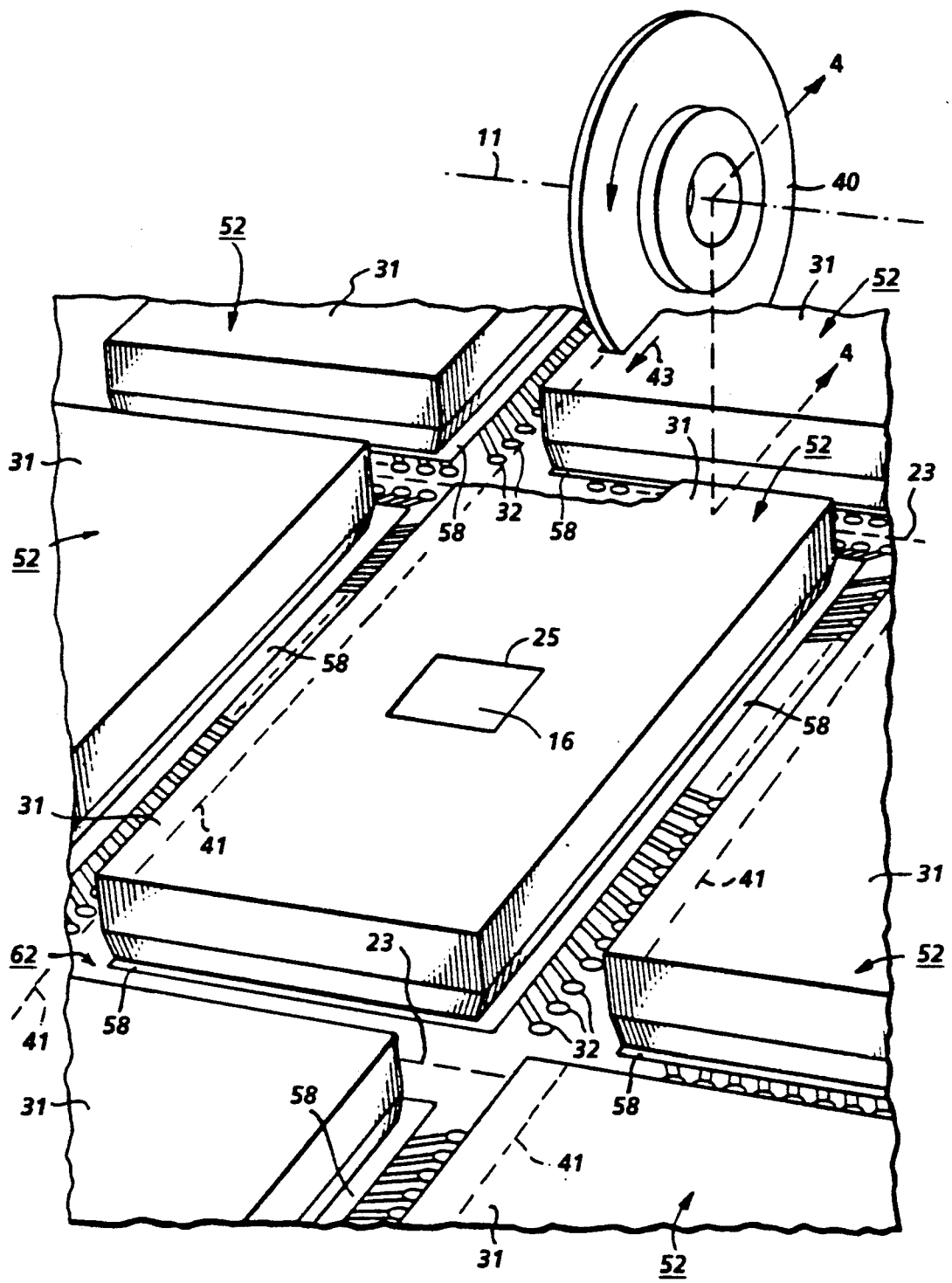
FIG. 3 is an enlarged isometric view of the channel substrate bonded to the heating element substrate, after the excess channel substrate material has been removed to expose the driver circuitry terminals, and showing a dicing blade as it forms the nozzle containing surfaces of the printheads.

In FIG. 3, a resin based dicing blade 40 is shown cutting across an edge of the channel plates 31 in the direction of arrow 43 to form the nozzles 27 and nozzle face 29 (see FIGS. 4 and 5) for the plurality of printheads 52. Prior to this dicing operation, excess silicon material is milled from the silicon wafer or substrate 60 to form the individual channel plates 31 and uncover the driver circuitry terminals 32. As disclosed in the patent to Torpey et al, etched grooves and recesses (not shown) around the periphery of the channel plates greatly assist in preventing damage to the terminals 32 during this silicon removal step by spacing the channel wafer therefrom.

In the preferred embodiment, the thick film polymer layer 58 between the channel plates 31 and the heating element substrate 62 is etched to remove it from the distal ends of the terminals 32. Each channel plate has an inlet 25 which may be separately etched in the channel plates or they may be simply formed by etching the reservoir 28 (see FIGS. 4 and 5) completely through the channel wafer from which the channel plates 31 are formed.

The dicing blade 10 is rotated about axis 11. For a dicing blade having a diameter of approximately 4.7 inches and a thickness of about 8 mils, the speed may range about 20,000 rpm. The blade has a relatively hard, dense resin bonded base material with substantially no abrasive fillers and contains a 60 to 90% concentration of natural or synthetic diamonds having a nominal diamond size range of 2 to 6 micrometers. The density reference is based on 72 carats per cubic inch. The dicing cut to provide the nozzle containing surface or nozzle face 29 with the appropriate surface finish and optionally to open the nozzles is made along dashed lines 41. The dashed cutting lines 23 which are perpendicular to the dashed cutting lines 41 delineate the travel of a standard dicing blade to complete the sectioning of channel plates 31 and heating element wafer 62 into separate printheads 52.

Figure 4:
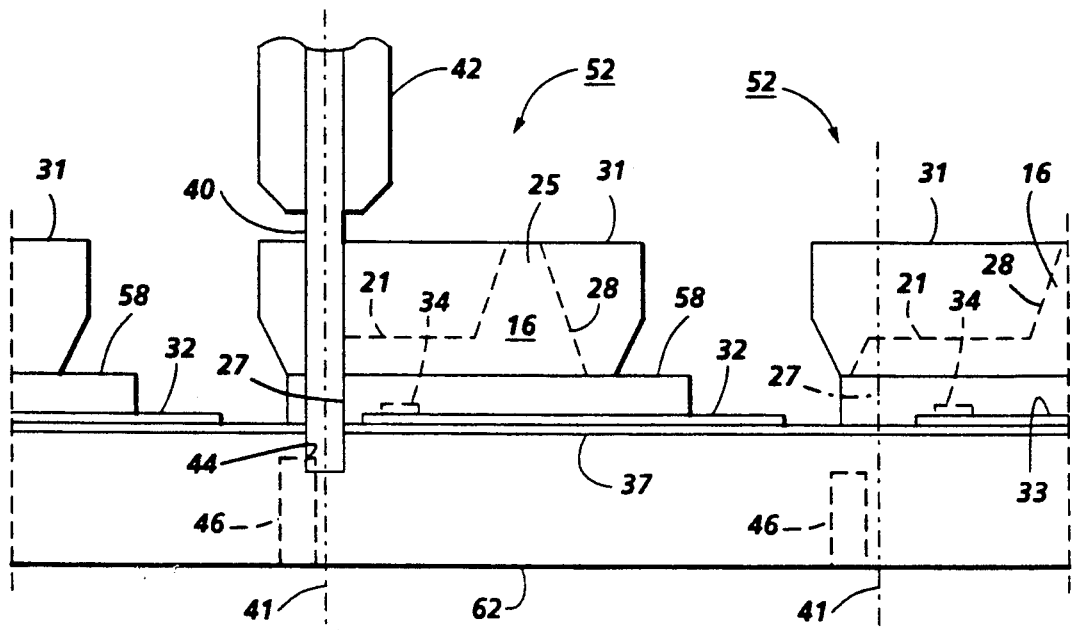
FIG. 4 is an enlarged partially shown cross sectional view of FIG. 3 taken along view line 4—4.

FIG. 4 is a cross-sectional view of FIG. 3 as viewed along view line 4—4 and shows that the dicing blade 40, held in blade holder 42, cuts through the channel plates 31, thick film layer 58, adhesive bonding layer (not shown), insulative underglazed layer 37 for the electrical driver circuitry, and partially into the heating element wafer 62 a predetermined distance. The ink channel 21, reservoirs 22, and the heating elements 34 are shown in dashed lines for reference to the dicing cut centerline 41. Note that these dicing cuts are perpendicular to and intersect the ends of channel grooves 21, so that the solid filler material therein is also cut. In the preferred embodiment, the filler material 16 is a polyglycol which is solid at room temperature and soluble in water; generally the polyglycol is solid below 18° C. or 90° F. Thus, the solid polyglycol supports the fragile edges of the silicon nozzles 27 in nozzle face 29, thereby eliminating or dramatically reducing chipping caused by the dicing blade. In addition, the channels 21 and reservoirs 28 are plugged or filled by the filler material and prevent entry of dicing debris. Further, because the polyglycol, when used as the filler material, is water soluble, it acts as a lubricant during the dicing process, for the dicing blade is constantly sprayed with a water based coolant and lubricant as the dicing blade cuts the silicon substrates.

In one embodiment, the heating element substrate 62 is optionally notched by a dicing process to place a kerf or notch 46, shown in dashed line, prior to the dicing cut along cut line 41 which produces the nozzle face 29 and nozzles 27 therein, when dicing blade 40 cuts notches 44. Although in the preferred embodiment the dicing blade 40 only notches the heating element wafer 62, it could completely cut through both the channel plates 31 and heating element wafer 62. The penalty for this complete cut through is a shorter life of the resin bonded blade. The shorter life is caused by the adhesive used to hold the heating element wafer 62 to a standard wafer holding film frame (not shown).

Figure 5:
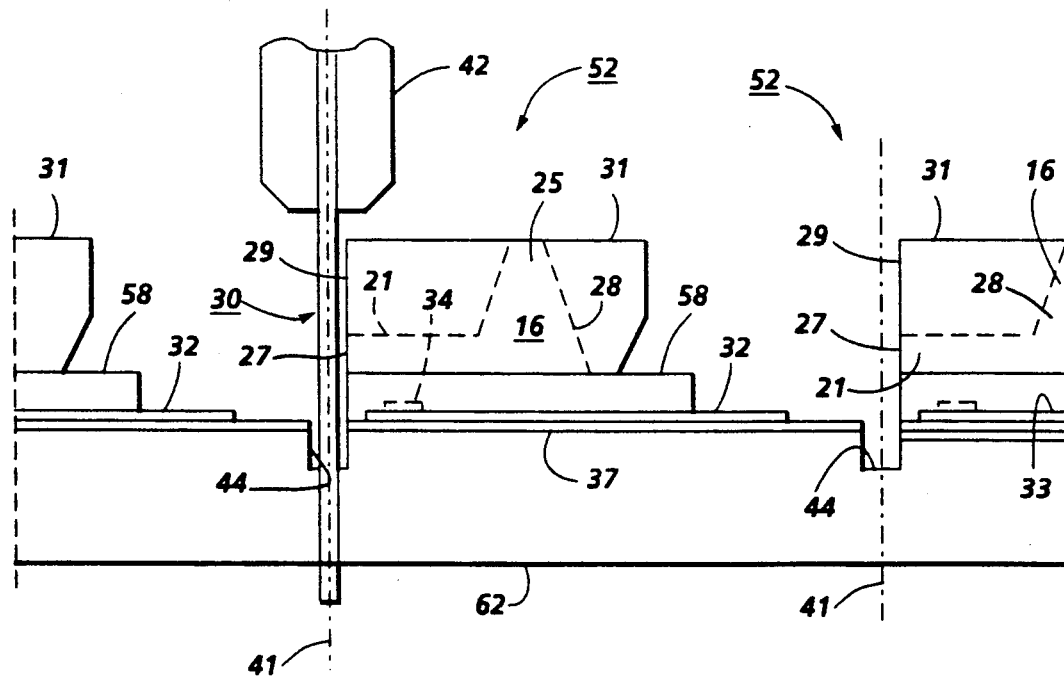
FIG. 5 is the same view as FIG. 4 but taken subsequent in time showing the second dicing operation which sections the bonded wafers into rows of printheads.

FIG. 5 is the same view as FIG. 4, but shown after nozzle 27 and nozzle containing surface 29 were formed by the dicing blade 40 as it cuts along dicing centerline 41. FIG. 5 shows the notches 49 in the heating element wafer 62 which were produced as a result of the cuts by dicing blades 40. Along the same dicing cut centerline 48 and also along dicing cut lines 23 perpendicular thereto, a standard dicing blade 30, optionally thinner than blade 40, severs the heating element wafer 62 and produces a plurality of separate print heads 52. If the dicing blade 30 is the same or thicker than the resin bonded blade 40, then the wafer 62 must be slightly tilted relative to the dicing blade (not shown), so that the nozzle containing surface 29 is not contacted.

Figure 6:
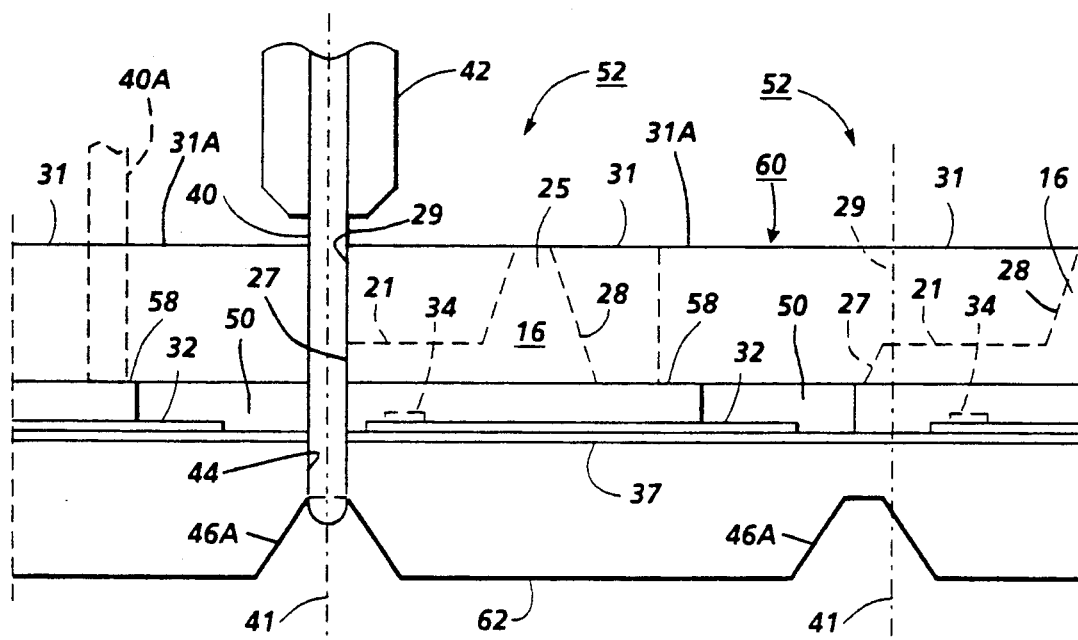
FIG. 6 is an enlarged partially shown cross-sectional view of another embodiment of the present invention, showing excess channel substrate material to be removed after the formation of the nozzles and nozzle face by the dicing saw.

An alternate embodiment is shown in FIG. 6, the etched channel wafer 60 with the plurality of sets of parallel channel grooves 21 with an associated reservoir 28 for each set of grooves is aligned and bonded to patterned thin film layer 58 on the heating element wafer 62. The heating element wafer contains a plurality of linear arrays of heating elements 34, shown in dashed line, driver circuitry (not shown), and electrical leads with terminals 32 formed on an electrically insulating underglaze layer 37. For more detailed information on the fabrication of the channel and heating element wafers, refer to U.S. Pat. No. Re 32,572 and U.S. Pat. No. 4,638,337 mentioned above and incorporated herein by reference. As disclosed in U.S. Pat. No. 4,638,337, a thick film layer is laminated over the heating elements and circuitry and patterned to form recesses therein. A recess is formed over each heating element to place it in a pit (not shown), and optionally between the printheads 52, providing space 50 between confronting front and back sides of the printheads prior to their separation by the dicing procedure. Either prior to or after mating and bonding the heating element wafer with the channel wafer, notches or kerfs 46A are made in the back surface of the heating element wafer, the surface opposite to the one having the heating elements and driver circuitry. The placement of notches 46A substantially aligns these notches with the subsequent cutting lines 41, so that the notches are parallel to the later formed printhead nozzle faces 29. The filler material 16 is then placed in the reservoirs and channels as discussed above.

The first dicing cut is along the cutting lines 41 shown in dashed line. The resinoid dicing blade 40, mounted in blade holder 42, forms the nozzle faces 29 and cuts deep enough to penetrate into the notches 46A, thus severing the bonded wafers 60, 62. This first dicing cut is through and perpendicular to the plurality of sets of channel grooves 21, opening one end of each groove to form nozzles 27. The excess silicon channel wafer material 31A is removed by a second cut by the resinoid dicing blade as shown in dashed line at 40A. The depth of this dicing cut is only through the channel wafer, thereby leaving channel plates 31 of the printheads 52. After spaced, parallel dicing cuts 23 are made in a direction perpendicular to the dicing lines 41, as shown in FIG. 3, the bonded pair of wafers are separated into a plurality of printheads 52 or bonded substrates 10.

After the bonded substrates 60, 62 have been diced into a plurality of individual printheads 52 or substrate pairs 10, the printheads are heated to remove the filler material or polyglycol. In one embodiment, the filler material is removed by placing the printheads into a container of water and heating the water. If another filler material is used such as wax, the printheads must subsequently be cleaned in a solvent after the wax is melted therefrom to remove all traces of the wax. Spinning and hot high pressure de-ionized (D.I.) water spray is also used effectively to remove the filler material.

In summary, the problems of chipping nozzles and forcing dicing debris into the channels and reservoirs when dicing silicon wafer pairs can be eliminated by using a filler material, which is solid or gels at room temperature, to fill the channels and reservoirs during the dicing process conducted at room temperature. The filler material supports the fragile edges of the silicon nozzles eliminating chipping, and the plugged channels and reservoirs prevent entry of dicing debris and other contaminants, such as dust and other miscellaneous particle encountered in the fabricating environment. After the wafer pairs have been diced to produce the plurality of individual printheads, the filler material is removed by heating the printheads together with accompanying techniques as required depending upon the specific material used, such as the use of a solvent, spinning, or high pressure spray.

Many modifications and variations are apparent from the foregoing description of the invention and all such modifications and variations are intended to be within the scope of the present invention.

We claim:

1. A method of fabricating thermal ink jet printheads, comprising the steps of:
   (a) aligning and bonding together a pair of substrates having confronting surfaces, the confronting surface of one substrate containing a plurality of sets of linear arrays of heating elements and associated driver circuitry, the confronting surface of the other substrate containing a plurality of sets of equally spaced, parallel grooves and a plurality of reservoirs, each reservoir having an inlet and being in communication with a set of grooves, the aligning and bonding of said pair of substrates placing a heating element in each groove;
   (b) placing a container having a quantity of filler material therein into a vacuum chamber;
   (c) placing the bonded pair of substrates into said vaccum chamber and evacuating air from the grooves and reservoirs through said inlets;
   (d) heating the filler material in a vacuum until the filler is in a liquid state;
   (e) inserting said air-evacuated pair of substrates into the liquid filler material in said container in the vacuum chamber without interrupting the vacuum in said vacuum chamber;
   (f) removing the pair of substrates from the liquid filler material;
   (g) cooling the pair of substrates and filler material to room temperature; and
   (h) removing the pair of substrates with solid filler material filling the grooves and reservoirs from the vacuum chamber;
   (i) severing the bonded pair of substrates into a plurality of individual printheads by dicing processes at room temperature, one dicing process cutting the grooves in a direction perpendicular thereto in order to form concurrently a nozzle face and a plurality of nozzles therein, whereby the solid filler material supports fragile edges of the substrates during the dicing process and the filled grooves and reservoirs prevent entry of dicing debris or other contaminants; and
   (j) heating the plurality of individual printheads to remove the filler material from the grooves and reservoirs.

2. The fabricating method of claim 1, wherein the filler material is a gelatin which gels at room temperature; and wherein the pair of substrates remains in the gelatin in said container until the gelatin cools and gels, prior to removal of the pair of substrates from the container.

3. The fabricating method of claim 1, wherein said gelatin has optical clarity, so that gelatin outside of the grooves and reservoir does not impede the dicing operation by impairing visual alignment in a dicing saw, and necessitating removal of the gelatin not in the grooves and reservoirs.

4. The fabricating method of claim 1, wherein the substrates are silicon; and wherein the filler material is a polyglycol which is solid at room temperature and liquid at higher temperatures and which is soluble in water, so that the polyglycol acts as a lubricant during the dicing processes.

5. The fabricating method of claim 1, wherein the filler material is a mixture of ethoxylated polyethylene alcohol wax, which is solid at room temperature, and polyoxyethylene, said mixture exhibiting substantially reduced solubility in room temperature water and readily soluble in hot water.

6. The fabricating method of claim 5, wherein the room temperature is about 25° C.; and wherein the hot water temperature is about 60° C. or higher.

7. The fabricating method of claim 2, wherein the mixture is 5% to 50% polyethylene alcohol wax by weight.

* * * * *